United States Patent [19]

Turbett

[11] 4,440,671

[45] Apr. 3, 1984

[54] COMPOSITIONS OF HYDROCARBON-SUBSTITUTED DIPHENYL AMINES AND HIGH MOLECULAR WEIGHT POLYETHYLENE GLYCOLS; AND THE USE THEREOF AS WATER-TREE RETARDANTS FOR POLYMERS

[75] Inventor: Robert J. Turbett, Millington, N.J.

[73] Assignee: Union Carbide Corporation, Danbury, Conn.

[21] Appl. No.: 469,178

[22] Filed: Feb. 23, 1983

Related U.S. Application Data

[63] Continuation of Ser. No. 362,959, Mar. 31, 1982.

[51] Int. Cl.$^3$ .............................................. H01B 3/18
[52] U.S. Cl. .................................... 252/573; 252/575; 252/578; 524/258; 524/585
[58] Field of Search ................. 524/258, 585; 252/573, 252/575, 578

[56] References Cited

U.S. PATENT DOCUMENTS

| | | |
|---|---|---|
| 3,296,189 | 1/1967 | Eastman . |
| 3,452,056 | 6/1969 | Sundholm . |
| 3,655,559 | 4/1972 | Holt . |
| 3,956,420 | 5/1976 | Kato et al. . |
| 3,979,180 | 9/1976 | Lorand ............................... 524/258 |
| 4,206,260 | 6/1980 | McMahon . |
| 4,263,158 | 4/1981 | Ashcraft et al. .................... 524/585 |
| 4,305,849 | 12/1981 | Kawasaki et al. . |

FOREIGN PATENT DOCUMENTS 53-138996 10/1978 Japan .

Primary Examiner—Joseph L. Schofer
Assistant Examiner—N. Sarofim
Attorney, Agent, or Firm—James C. Arvantes; Robert C. Brown

[57] ABSTRACT

The disclosure of this application is directed to a composition which serves to improve the water-treeing resistance of polymeric compositions comprising a hydrocarbon-substituted diphenyl amine and a high molecular weight polyethylene glycol. Polymeric compositions containing the water-tree retardant additives are useful as extrudates about electrical conductors.

34 Claims, 1 Drawing Figure

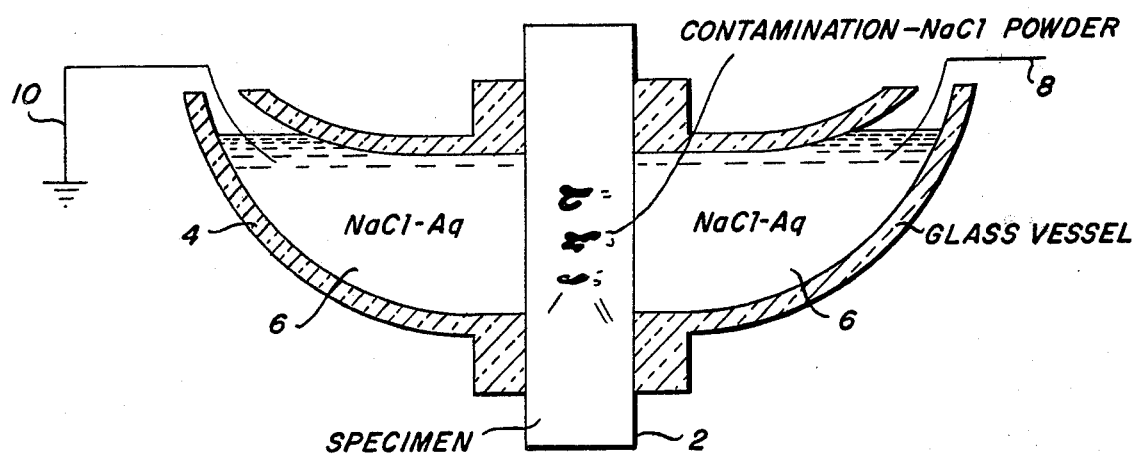

COMPOSITIONS OF HYDROCARBON-SUBSTITUTED DIPHENYL AMINES AND HIGH MOLECULAR WEIGHT POLYETHYLENE GLYCOLS; AND THE USE THEREOF AS WATER-TREE RETARDANTS FOR POLYMERS

This application is a continuation of our prior U.S. application Ser. No. 362,959 filed Mar. 31, 1982.

SUMMARY OF THE INVENTION

This invention relates to water-tree retardants comprising hydrocarbon-substituted diphenyl amines and high molecular weight polyethylene glycols and the use thereof as additives to polymeric compositions, as for example, compositions based on ethylene polymers. The resultant compositions are useful as extrudates about electrical conductors providing insulation thereon which is resistant to water-treeing.

BACKGROUND OF THE INVENTION

The service life of insulated power cables is known to be shortened by a prebreakdown phenomenon termed water-treeing. Consequently, insulation based on polymeric compositions, as for example, compositions of ethylene polymers, has been modified by the addition thereto of various additives for the purpose of providing insulation characterized by resistance to water-treeing. Water-trees occur when insulation is subjected to an electrical field, over a prolonged period of time, while in an environment in which water is present. Water-trees are so named because of a resemblance to branched trees. In actuality, water-trees are fine passages or voids which are visibly white when filled with water but become invisible when dry. For purposes of observation, specimens with water-trees must be boiled in water or dyed.

Water-trees start to grow at points of voltage stress in the insulation. Points of stress might be at sites in the insulation at which there are voids, contamination, or irregularities, for instance at the interface between the insulation and a semi-conductive layer. In the case of voids of contamination, trees tend to form at opposite sides of the point of stress (the nucleus) and, in time, grow to resemble a bow-tie. Trees initiated at an interface grow in one direction in the form of a bush and are referred to as vented trees. The two types of water-trees, bow-tie and vented, appear to start and to grow by different mechanisms, as indicated by their differing response to many of the water-tree retardants that have been examined.

Up until the present time, no single water-tree retardant system has been developed which, when added to a polymeric composition, results in a composition which has a commercially acceptable balance of properties including resistance, over prolonged periods of time, to the formation of bow-tie trees and vented water-trees.

DESCRIPTION OF THE DRAWING

The accompanying drawing is a schematic sectional view showing the apparatus used to cause water-trees of the bow-tie type to grow in a test specimen.

DESCRIPTION OF THE INVENTION

The present invention provides a water-tree retardant composition comprising a hydrocarbon-substituted diphenyl amine and a high molecular weight polyethylene glycol which, when added to polymeric materials such as an ethylene polymer, provides compositions which have a commercially acceptable balance of properties including resistance to the formation of bow-tie water-trees and vented water-trees. The compositions of this invention retain resistance to water-trees over prolonged periods of time, at normal operating or service temperatures of the insulated electrical conductors, about which they are extruded, without undergoing an undesirable degradation of physical or electrical properties. In addition, the compositions of this invention can be cured to water-tree resistant, crosslinked products, without a significant increase in the normal concentrations of the crosslinking agent, i.e., the organic peroxide, by the addition of an appropriate crosslinking booster.

As stated, the water-tree retardants of this invention comprise a composition of a hydrocarbon-substituted diphenyl amine and a high molecular weight polyethylene glycol.

Among diphenyl amines, substituted by one or more hydrocarbon radicals on the aromatic rings, which are suitable for purposes of this invention are those having the formula:

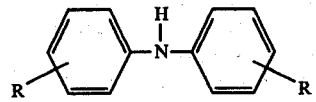

FORMULA I wherein each R, which can be the same or different, is hydrogen or a hydrocarbon radical such as alkyl or aralkyl radicals substituted in the para and/or ortho positions relative to the amino group, provided that at least one R is a hydrocarbon radical.

As a rule, each R has 5 to 18 carbon atoms, preferably 8 to 9 carbon atoms. Illustrative of such radicals are those derived from α-olefins such as n-hexene, n-heptene, n-octene, n-nonene and the like as well as radicals derived from styrene, α-methyl styrene and the like.

Particularly desirable for purposes of this invention are liquid diphenyl amines, as described, such as a diphenyl amine alkylated with styrene or octylene. A liquid diphenyl amine alkylated with styrene and sold by Goodyear Tire and Rubber Company under the tradename of Wingstay 29 is an example of such a compound. This compound is obtained by reacting diphenyl amine with styrene under alkylation conditions using a Friedel-Crafts catalyst, according to the following idealized equation:

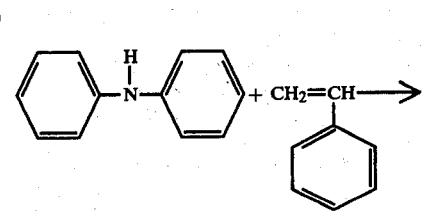

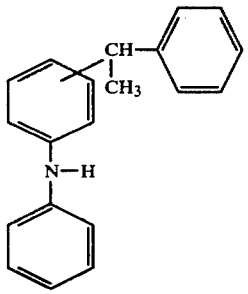

It actuality, it is believed that this compound is a mixture of mono and disubstituted species.

Compositions containing a liquid, hydrocarbon-substituted diphenyl amine, in conjunction with a high molecular weight polyethylene glycol, in addition to being characterized by the properties previously described, are relatively free of "blooming", a term used to describe surface exudation.

Other suitable diphenyl amines are described subsequently herein.

Polyethylene glycols, suitable for purposes of this invention, are those having a molecular weight of about 1,000 to about 20,000. Particularly desirable polyethylene glycols have a carbon number, that is, number of carbon atoms of at least 30, preferably at least 80. Commercially available polyethylene glycols, suitable for purposes of this invention, are marketed by Union Carbide Corporation under the trademark "Carbowax" and under the designation 20M. These materials are described in Union Carbide Corporation Brochure No. F-4772 I, 1/78 entitled, "Carbowax, Polyethylene Glycol".

Amount of polyethylene glycol, relative to the diphenyl amine is sufficient to provide a composition which, when added to a polymeric material, will result in a polymeric composition which has improved resistance to water-treeing.

Preferably the amount of polyethylene glycol, relative to the hydrocarbon-substituted diphenyl amine is about 0.2 to about 1 part by weight per 1 part by weight of the diphenyl amine.

Among suitable polymeric material to which the aforenoted treeretardant composition can be added in order to provide water-tree resistant compositions are ethylene polymers such as normally solid homopolymers of ethylene, copolymers of ethylene and α-olefins and copolymers of ethylene α-olefins and diene monomers. Exemplary of suitable copolymerizable monomers are α-olefins such as propylene, butene-1, hexene-1, and the like; diene monomers such as butadiene, isoprene and the like; wherein the polymers contain at least about 70 percent by weight ethylene.

Preferred copolymers are ethylene-propylene copolymers, ethylenebutene copolymers and the like. These copolymers can be produced under low pressure of about 150 to about 300 psi, using a chromium oxide catalyst modified with titanium as disclosed in U.S. Pat. No. 4,011,382 granted Mar. 8, 1977.

If desired, other polymers such as polypropylene, ethylene-propylene rubber, ethylene-propylene diene rubber and the like can be added to the ethylene polymer compositions of this invention.

The compositions of this invention can contain antioxidants such as sterically hindered phenols and amines, polymerized 2,2,4-tetramethylhydroquinoline, 4,4'-thio-bis-(6-t-butyl-3-methylphenol), thiodiethylenebis-(3,5-ditert-butyl-4-hydroxy)hydrocinnamate, distearylthiodipropionate and the like.

Also, the compositions of the present invention can contain crosslinking agents when the compositions are to be used as vulcanized or crosslinked products rather than as thermoplastic compositions. Vulcanizing or crosslinking agents are well known in the art and include organic peroxides as described in U.S. Pat. No. 3,296,189, granted Jan. 3, 1967. These compounds can be used singly, or in combination with one another, or in combination with a crosslinking booster.

Particularly desirable curable compositions for purposes of this invention comprise an ethylene polymer, a liquid hydrocarbon-substituted diphenyl amine, a high molecular weight polyethylene glycol, an organic peroxide and a silane crosslinking booster having the formula:

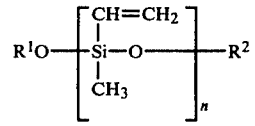

FORMULA II wherein $R^1$ and $R^2$, which can be the same or different, are hydrocarbon radicals generally having 6 to 18 carbon atoms, preferably 12 to 14 carbon atoms, and n is an integer having a value of 4 to 20, preferably 4 to 16; or a silane crosslinking booster having the formula:

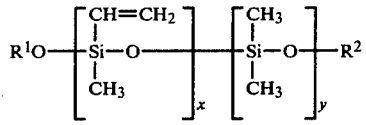

FORMULA III wherein $R^1$ and $R^2$ are as previously defined and x and y, which can be the same or different, are integers having a value of 4 to 8.

Illustrative of suitable radicals for $R^1$ and $R^2$ are alkyl radicals such as octyl, nonyl, decyl, undecyl, dodecyl, stearyl and the like.

Preparation of silanes falling within the scope of Formula II and Formula III can be conveniently prepared by reacting methylvinyldichlorosilane or a mixture of methylvinyldichlorosilane and dimethyldichlorosilane with water and a fatty alcohol or mixtures of fatty alcohols followed by equilibration and neutralization of the acidic residues. The molar ratios of water and alcohol can be varied with respect to each mole of difunctional chlorosilane such that the following stoichiometric equation holds, wherein for purposes of convenience the reactants are shown to be methylvinyldichlorosilane, water and dodecyl alcohol.

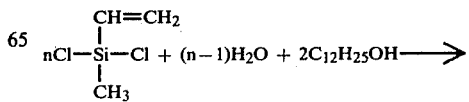

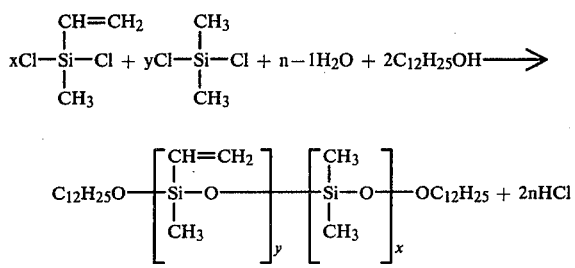

In preparing silanes falling within the scope of Formula III, the amount of methylvinyldichlorosilane (x) plus the amount of dimethylchlorosilane (y) will be equal to n, according to the following stoichiometric reaction scheme:

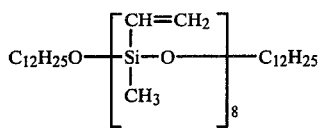

The specifics of the reaction are shown by the procedures detailed below.

Silane 1—characterized by gel permeation chromatography and nuclear magnetic resonance as having the average formula:

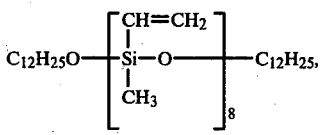

Silane 1 was prepared as follows:

Into a two liter, 3-necked flask equipped with an addition funnel, mechanical stirrer, thermometer and distillation head, with receiver protected by a nitrogen by-pass, was added 846.0 g (6.0 moles) of methylvinyldichlorosilane. From the addition funnel there was added 294.7 g (1.5 moles) of dodecanol to the flask at a moderate rate with stirring. The temperature of the flask decreased to $<10°$ C. due to evolution of HCl. After the dodecanol had been added, 89.7 g (5.0 moles, or 95% of the stoichiometric amount) of water were slowly charged from the addition funnel while maintaining the flask temperature at $10°\pm5°$ C. with an external ice bath. After the water was added, the flask was held at $15°\pm5°$ C. for an additional 3 hours with stirring (the HCl equilibration step). The addition funnel was replaced by a $N_2$-sparge tube and the contents of the flask were slowly heated to 90° C., continuously removing HCl from the flask. After 30 minutes, a sample from the flask was analyzed and found to contain 0.11 meq $Cl^-/g$ sample. The remaining amount of water (4.5 g, 0.25 mole) was added as a saturated $Na_2CO_3$ solution. Heating was resumed for an additional 30 minutes at 80° C., continuing the $N_2$-sparge throughout. The remaining acid chloride was neutralized with damp $NaHCO_3$. The resulting product was filtered, yielding 759.0 g (theory 792.5 g) 96% of theory of a clear, colorless fluid of 16.5 cstk viscosity (at 25° C.), having a chloride content of 0.01 meq/g (0.04%).

The source of dodecanol used in preparing the silanes noted herein was a Procter & Gamble product Co-1214 Fatty Alcohol, a brand name for a mixture containing dodecanol and a small amount of $C_{14}$ alcohol.

Silane 2—characterized by gel permeation chromatography and nuclear magnetic resonance as having the average formula:

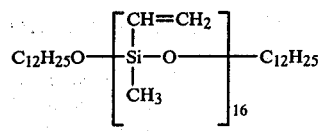

Into a 1 liter, 3-necked flask equipped with an additional funnel, condenser, mechanical stirrer, thermometer, and protected with a nitrogen by-pass was added 282.0 g (2.0 moles) of methylvinyldichlorosilane. From the addition funnel there was added 98.25 g (0.5 mole) of dodecanol, slowly with stirring, while maintaining the temperature between 10°-15° C. After the dodecanol had been added, 28.4 g (1.58 moles, 90% of required stoichiometry of 1.75 moles) water were added with stirring maintaining a temperature between 10°-15° C. on the reaction vessel by means of an ice bath. The contents of the flask were stirred for 3 hours at a temperature between 10°-15° C. The addition funnel was replaced by a tube inserted into the liquid reaction mixture and nitrogen was passed through the mixture while heating to a temperature of 90° C. with stirring to remove hydrogen chloride from the flask. After 0.5 hour at a temperature of 90° C., the remaining quantity of a water (3.1 g) was added as saturated $Na_2CO_3$. All residual hydrogen chloride was then neutralized as described for the preparation of Silane 1. After filtration, 250 g of a clear, colorless fluid of 18.4 cstk (25° C.) viscosity were obtained.

Silane 3—characterized by gel permeation chromatography and nuclear magnetic resonance as having the average formula:

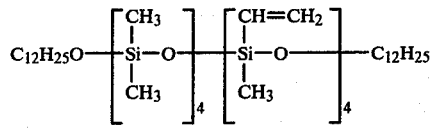

Silane 3 was prepared following the procedure described with respect to Silane 1, by reacting 282.0 g (2 moles) methylvinyldichlorosilane, 46.6 g (0.25 moles) dodecanol and 33.75 g (1.875 moles) $H_2O$ to produce 178.5 g of a clear colorless fluid.

Silane 4—characterized by gel permeation chromatography and nuclear magnetic resonance as having the average formula:

Silane 4 was prepared by following the procedure described with respect to Silane 1, by reacting 141.09 g (1.0 mole) methylvinyldichlorosilane, 129.1 g(1.0 mole) dimethyldichlorosilane, 93.29 (0.5 mole) dodecanol and 31.5 g(1.75 moles) water to produce 193.5 g of a clear, colorless fluid.

In formulating the compositions of this invention, the amount of hydrocarbon-substituted diphenyl amine, high molecular weight polyethylene glycol, organic peroxide and silane crosslinking booster, based on the total weight of the composition are as follows:

The diphenyl amine is present, along with the high molecular weight polyethylene glycol, in an amount sufficient to improve the water-tree resistance of the composition, generally in an amount of about 0.2 to about 2 percent by weight, preferably about 0.5 to about 1 percent by weight.

The high molecular weight polyethylene glycol, along with the diphenyl amine, is present in an amount sufficient to improve the water-tree resistance of the composition, generally in an amount of about 0.2 to about 1 percent by weight, preferaby about 0.2 to about 0.5 percent by weight.

The organic peroxide is present in an amount sufficient to cure the composition to a crosslinked product, generally in an amount of about 1 to about 3 percent by weight, preferably in an amount of about 1.5 to about 2 percent by weight.

The crosslinking booster is present in an amount of about 0.5 to about 2 percent by weight, preferably about 0.5 to about 1.5 percent by weight.

It is to be noted that mixtures of ingredients, as disclosed herein, can be used if so desired.

The following is a description of materials used to conduct the Examples and Controls of Table I and Table II, which follow.

DESCRIPTION OF THE POLYMERS

Polymer A—Copolymer of ethylene and n-butene having a melt index of 0.7 and a density of 0.92.

Polymer B—Polyethylene having a melt index of 2 and a density of 0.92.

Polymer C—Polyethylene having a melt index of 0.2 and a density of 0.92.

DESCRIPTION OF THE DIPHENYL AMINES (DPA)

I. Diphenyl amine alkylated with styrene (Wingstay 29-Goodyear Tire and Rubber Company)—liquid II. Diphenyl amine alkylated with diisobutylene (Naugalube 438L-Uniroyal, Inc.)—liquid III. Diphenyl amine alkylated with octylene (Stalite-R. T. Vanderbilt Company, Inc.)—liquid IV. Diphenyl amine alkylated with α-methyl styrene (Naugard 445Uniroyal, Inc.)—solid V. Diphenyl amine alkylated with octylene (Stalite-S-R. T. Vanderbilt Company, Inc.)—solid

DESCRIPTION OF ANTIOXIDANTS (AO)

AO-1—4,4'-thio-bis-(6-t-butyl-3-methylphenol)
AO-2—Distearylthiodipropionate
AO-3—Thiodiethylene-bis-(3-5-di-t-butyl-4-hydroxy)hydrocinnamate

POLYETHYLENE GLYCOL

Polyethylene glycol—molecular weight about 4000—sold under the trademark "Carbowax" by Union Carbide Corporation Polyethylene glycol—molecular weight about 20,000—sold under the designation 20M by Union Carbide Corporation Procedures used in formulating and testing compositions of Table I are described below.

Ethylene polymer, alkylated diphenyl amine and high molecular weight polyethylene glycol were charged into a Brabender mixer and compounded to a melt temperature of about 150° C. The resultant composition was granulated and compression molded into test plaques at a temperature of 160° C. Vented Water-Trees—measured as Water Tree Growth Rate (WTGR)—determined as described in detail in U.S. Pat. No. 4,263,158 granted Apr. 21, 1981, the disclosure of which is incorporated herein by reference. WTGR was determined under the following conditions—1 KHz, 5 KV, 72 hours.

By definition, the WTGR of a composition to which no water-tree resistant additive has been added, is 1.0 (Control 6 in Table I; Control A in Table II).

Bow-Tie Water-Trees—determined by viewing under a microscope, magnification 40X, specimens prepared as described for the WTGR test and noting the number and size of the bow-tie trees. Each test specimen was rated qualitatively on a scale of 0 (no bow-tie water-trees) to 4 (numerous bow-tie water-trees).

Blooming—determined by molding specimens 1/100 of an inch thick, allowing the specimens to stand at room temperature for one month, visually examining the surface of the specimens for exudation and making a qualitative evaluation.

From a commercial standpoint, the primary aims with respect to compositions to be used as insulation about electrical conductors, which in turn are to be exposed to a water environment, are:

WTGR—equal to or less than 0.2
Bow-Tie Water Tree Rating—less than 4
Blooming—low level of surface exudation The Examples of Table I and Table II illustrate the present invention and are not intended to limit the scope thereof.

Amounts noted in the Tables are in parts by weight.

TABLE 1

| | Example 1 | Control 1 | Example 2 | Control 2 | Example 3 | Control 3 | Control 4 | Control 5 | Control 6 | Control 7 |
|---|---|---|---|---|---|---|---|---|---|---|
| Polymer A | 98.75 | 99.25 | 98.75 | 99.5 | 99.0 | 99.5 | 98.9 | 99.5 | — | 99.9 |
| Polymer C | — | — | — | — | — | — | — | — | 99.9 | — |
| DPA I | 0.75 | 0.75 | — | — | — | — | — | — | — | — |
| DPA II | — | — | — | — | — | — | — | — | — | — |
| DPA III | — | — | 0.75 | 0.5 | — | — | — | — | — | — |
| DPA IV | — | — | — | — | 0.5 | 0.5 | — | — | — | — |
| DPA V | — | — | — | — | — | — | — | 0.5 | — | — |
| Polyethylene Glycol Molecular Weight 4000 | — | — | — | — | — | — | 1.0 | — | — | — |
| Polyethylene Glycol | 0.5 | — | 0.5 | — | 0.5 | — | — | — | — | — |

TABLE 1-continued

|  | Example 1 | Control 1 | Example 2 | Control 2 | Example 3 | Control 3 | Control 4 | Control 5 | Control 6 | Control 7 |
|---|---|---|---|---|---|---|---|---|---|---|
| Compound 20M |  |  |  |  |  |  |  |  |  |  |
| AO-1 | — | — | — | — | — | — | — | — | 0.1 | — |
| AO-3 | — | — | — | — | — | — | 0.1 | — | — | 0.1 |
| WTGR | 0.16 | 0.73 | 0.09 | 0.4 | 0.15 | 0.26 | 0.29 | 0.44 | 1.0 | 1.0 |
| Blooming | Low-Medium | Heavy | Low | Low | Low | Heavy | Low | Low | Low | Low |
| Bow-Tie Water-Tree Rating | 2 | 4 | 2 | 4 | 1 | 4 | 0 | 4 | — | 4 |

The crosslinked compositions of Table II were prepared by charging the ingredients into a Brabender mixer and compounding the resultant mixture to a melt temperature of about 120° C. Each composition was granulated and compression molded into test specimens at a temperature of 125° C. Test specimens were cured while in the mold at a temperature of 180° C. Before testing for WTGR, each cured test specimen was annealed for 15 minutes in an oven which was at a temperature of 115° C. after which peroxide residues were removed by heating the test specimens for seven days in a vacuum oven which was at a temperature of 85° C.

Tests reported in Table II were conducted as follows:
WTGR—determined at 5 KV, 1 KHz, 72 hours Degree of cure for each composition was determined by the Monsanto Rheometer test, described in detail in U.S. Pat. No. 4,018,852 granted Apr. 19, 1977, and reported in lbs.-inch.

Resistivity to physical degradation—determined using cured specimens, prepared as described above, by testing for retention of elongation according to procedures described in ASTMD-638.

Blooming—determined by allowing uncured molded specimens to stand for one month at temperatures ranging from 7° C. to 60° C., visually examining the surface of the specimens for exudation and making a qualitative evaluation.

Bow-Tie Water-Trees—determined, for each composition, by molding two sheets, each 0.02 inch thick, placing a small amount of powdered NaCl at the interface of the two sheets and molding the two sheets together at a temperature of 125° C. to form test specimens. Test specimens were cured in a mold at a temperature of 180° C. Peroxide residues were removed by heating the test specimens for seven days in a vacuum oven which was at a temperature of 85° C.

Referring now to the accompanying drawing, test specimen (2) was placed and held at the center opening of glass vessel (4) dividing glass vessel (4) into two compartments. Test specimen (2) was in contact with 0.1 normal aqueous solution of sodium chloride (6) contained in glass vessel (4). Aqueous solution (6) was connected to a voltage source (not shown) through a high voltage wire lead (8) and grounded through ground wire (10). An AC voltage—5 KV, 1 KHz was applied to the lead wire for 2 days. After the two day period, the specimen was dyed with aqueous methylene blue solution which made the water-trees visible. Each test specimen was examined visually under a microscope, magnification of 40X, and rated qualitatively on a scale of 0 (no bow-tie water-trees) to 4 (numerous bow-tie water-trees).

The primary commercial aims with respect to WTGR, Bow-Tie Water-Trees and Blooming have been described previously.

The primary commercial aim with respect to degree of cure is 48±4 lbs.-inch; percent retention of elongation, 7 days at 150° C., greater than 75 percent.

TABLE II

|  | Control A | Control B | Control C | Control D | Control E | Example 4 | Example 5 |
|---|---|---|---|---|---|---|---|
| Composition |  |  |  |  |  |  |  |
| Polymer C | 99.9 | — | — | — | — | — | — |
| Polymer B | — | 97.94 | 96.94 | 96.95 | 96.05 | 96.45 | 95.55 |
| Silane 1 | — | — | — | 0.6 | 1.50 | 0.6 | 1.50 |
| Polyethylene Glycol - 400 MW | — | — | 1.0 | — | — | — | — |
| Polyethylene Glycol - Compound 20M | — | — | — | — | — | 0.50 | 0.50 |
| DPA-1 | — | — | — | 0.75 | — | 0.75 | — |
| DPA 2 | — | — | — | — | 0.75 | — | — |
| DPA 3 | — | — | — | — | — | — | 0.75 |
| Dicumyl peroxide | — | 1.7 | 1.7 | 1.7 | 1.7 | 1.7 | 1.7 |
| AO-1 | 0.1 | — | — | — | — | — | — |
| AO-2 | — | 0.18 | 0.18 | — | — | — | — |
| AO-3 | — | 0.18 | 0.18 | — | — | — | — |
| Properties |  |  |  |  |  |  |  |
| Cure Level, Lbs.-Inch | — | 46 | 40 | 44 | 49 | 48 | 53 |
| WTGR | 1.0 | 1.0 ± .25 | 0.24 | 0.34 | 0.37 | 0.10 | 0.02 |
| Bow Tie Water-Trees-Rating | — | 4 | 0 | 4 | 4 | 1 | 3 |
| Percent Retention of Elongation 7 days at 150° C. | — | 90 | 10 | 100 | 8 | 90 | 60 |
| Blooming | — | Low | Low | Med | Low | Low | Heavy |

Silane boosters, noted herein, are the subject of an application filed by Herbert E. Petty, Ser. No. 361,632 filed 3-26-82 abandoned refiled as continuation 467,572, 2-17-83, now U.S. Pat. No. 4,426,480 and assigned to a common assignee Union Carbide Corporation.

Melt index, as noted herein, is in decigrams per minute determined by ASTM test D-1238.

Density, as noted herein, is in grams per cubic centimeter determined by ASTM test D-1505.

What is claimed is:

1. A composition, which serves to improve resistance to water-treeing in polymeric compositions, comprising a hydrocarbon-substituted diphenyl amine and a high molecular weight polyethylene glycol.

2. A water-tree retardant additive comprising a liquid, hydrocarbon-substituted diphenyl amine and a polyethylene glycol having a molecular weight of about 1,000 to about 20,000 in an amount of about 0.2 to about 1 part by weight per each part by weight diphenyl amine.

3. A water-tree retardant additive as defined in claim 1 wherein the said amine is diphenyl amine alkylated with styrene.

4. A water-tree retardant additive as defined in claim 1 wherein the said amine is diphenyl amine alkylated with octylene.

5. A water-tree retardant additive as defined in claim 1 wherein the said amine is diphenyl amine alkylated with α-methyl styrene.

6. A water-tree retardant additive as defined in claim 1 wherein the said glycol has a molecular weight of about 4,000.

7. A water-tree retardant additive as defined in claim 1 wherein the said glycol has a molecular weight of about 20,000.

8. A composition, suitable for improving the water-treeing resistance and for crosslinking a polymeric composition, comprising a hydrocarbon-substituted diphenyl amine, a polyethylene glycol having a molecular weight of about 1,000 to about 20,000, an organic peroxide and a crosslinking booster.

9. A composition as defined in claim 8 wherein the crosslinking booster has the formula:

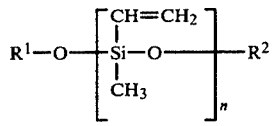

wherein $R^1$ and $R^2$ are hydrocarbon radicals and n is an integer having a value of 4 to 16.

10. A composition as defined in claim 8 wherein the crosslinking booster has the formula:

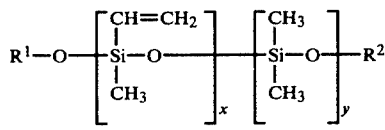

wherein $R^1$ and $R^2$ are hydrocarbon radicals and x and y are integers having a value of 4 to 8.

11. A composition as defined in claim 9 wherein the crosslinking booster is a methylvinyl siloxane, end blocked with $C_{12}$ hydrocarbon and n has a value of 8.

12. A polymeric composition, having improved resistance to water-treeing, containing a hydrocarbon-substituted diphenyl amine and a high molecular weight polyethylene glycol, said amine and said glycol being present in an amount sufficient to improve the water-treeing resistance of said composition.

13. A composition having improved resistance to water-treeing comprising an ethylene polymer, a hydrocarbon-substituted diphenyl amine in an amount of 0.2 to about 2 percent by weight and a polyethylene glycol, having a molecular weight of about 1,000 to about 20,000 in an amount of about 0.2 to about 1 percent by weight.

14. A composition as defined in claim 13 wherein said ethylene polymer is polyethylene.

15. A composition as defined in claim 13 wherein said ethylene polymer is an ethylene copolymer.

16. A composition as defined in claim 15 wherein said copolymer is an ethylene-butene copolymer.

17. A composition as defined in claim 13 wherein said amine is diphenyl amine alkylated with styrene.

18. A composition as defined in claim 13 wherein said amine is diphenyl amine alkylated with octylene.

19. A composition as defined in claim 13 wherein said amine is diphenyl amine alkylated with α-methyl styrene.

20. A composition as defined in claim 13 wherein said glycol has a molecular weight of about 4,000.

21. A composition as defined in claim 13 wherein said glycol has a molecular weight of about 20,000.

22. A composition as defined in claim 13 containing an organic peroxide.

23. The crosslinked product of the composition defined in claim 22.

24. A composition as defined in claim 13 containing an organic peroxide and a crosslinking booster.

25. A composition as defined in claim 24 wherein the said booster has the formula:

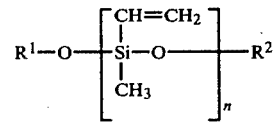

wherein $R^1$ and $R^2$ are hydrocarbon radicals and n is an integer having a value of 4 to 16.

26. A composition as defined in claim 24 wherein the said booster has the formula:

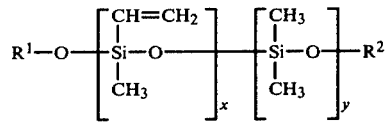

wherein $R^1$ and $R^2$ are hydrocarbon radicals and x and y are intergers each having a value of 4 to 8.

27. A composition as defined in claim 25 wherein the said silane is a methylvinyl siloxane end blocked with $C_{12}$ hydrocarbon and n has a value of 8.

28. The crosslinked product of the composition defined in claim 24.

29. A composition as defined in claim 25 wherein the silane is a methylvinyl siloxane end blocked with $C_{12}$ hydrocarbon and n has a value of 16.

30. A composition as defined in claim 26 wherein the silane is end blocked with $C_{12}$ hydrocarbon and x and y each have a value of 4.

31. A composition as defined in claim 9 wherein $R^1$ and $R^2$ are hydrocarbon radicals having 6 to 18 carbon atoms.

32. A composition as defined in claim 10 wherein $R^1$ and $R^2$ are hydrocarbon radicals having 6 to 18 carbon atoms.

33. A composition as defined in claim 25 wherein $R^1$ and $R^2$ are hydrocarbon radicals having 6 to 18 carbon atoms.

34. A composition as defined in claim 26 wherein $R^1$ and $R^2$ are hydrocarbon radicals having 6 to 18 carbon atoms.

* * * * *

UNITED STATES PATENT AND TRADEMARK OFFICE
CERTIFICATE OF CORRECTION

PATENT NO. : 4,440,671
DATED : April 3, 1984
INVENTOR(S) : Robert J. Turbett

It is certified that error appears in the above—identified patent and that said Letters Patent is hereby corrected as shown below:

Column 1, line 44, "of" should read -- or --

Column 3, line 15, "It" should read -- In --

Column 3, line 46, "treeretardant" should read -- tree-retardant --

Column 3, line 50, after "ethylene" insert a comma

Column 3, line 57, "ethylenebutene" should read -- ethylene-butene --

Column 6, lines 31-32, "a water" should read -- water --

Column 6, line 64, "141.09" should read -- 141.09 g --

Column 6, line 66, "93.29" should read -- 93.29 g --

Column 8, line 5, "(3-5-di-t-butyl-4-hydroxy)" should read,
             -- (3,5-di-t-butyl-4-hydroxy) --

Column 9, in Table II, "400 MW" should read -- 4000 MW --

Signed and Sealed this

Fourteenth Day of August 1984

[SEAL]

Attest:

GERALD J. MOSSINGHOFF

Attesting Officer

Commissioner of Patents and Trademarks